[19] United States Patent
Giuli

[11] Patent Number: 4,544,926
[45] Date of Patent: Oct. 1, 1985

[54] ADAPTIVE JAMMING-SIGNAL CANCELER FOR RADAR RECEIVER

[75] Inventor: Dino Giuli, Florence, Italy

[73] Assignee: Selenia, Industrie Elettroniche Associate, S.p.A., Rome, Italy

[21] Appl. No.: 376,717

[22] Filed: May 10, 1982

[30] Foreign Application Priority Data

May 11, 1981 [IT] Italy .............................. 48438 A/81

[51] Int. Cl.[4] .......................................... G01S 7/36
[52] U.S. Cl. ................................... 343/18 E; 343/384
[58] Field of Search .................. 455/1; 343/18 E, 7 A, 343/378, 383, 384

[56] References Cited

U.S. PATENT DOCUMENTS 4,170,009 10/1979 Hamer ................................ 343/18 E

OTHER PUBLICATIONS

T. A. Bristow; Application of an Interference Cancellation Technique to Communications and Radar Systems; Sep. 1979; Systems Technology, No. 32, pp. 38–47.
Nathanson, Fred E., "Adaptive Circular Polarization" 1975, IEEE International Radar Conf. in Washington, D.C., FIG. 1.

Primary Examiner—T. H. Tubbesing
Assistant Examiner—Gilbert Barrón, Jr.
Attorney, Agent, or Firm—Karl F. Ross; Herbert Dubno

[57] ABSTRACT

A radar receiver, associated with a transmitter sending out circularly or linearly polarized waves, has two parallel channels for the respective processing of incoming echo signals derived from incident waves with mutually orthogonal linear (e.g. horizontal and vertical) polarization. For the suppression of interfering signals from a jammer, each channel includes an adaptive compensator generating a cancellation signal from the incoming signal of the other channel and from a feedback signal originating at the output of its own channel; this cancellation signal is subtracted from the incoming signal received by the respective channel. The resulting purged signals are fed to a channel selector which compares their power and directs the momentarily predominating signal to a load.

4 Claims, 4 Drawing Figures

ADAPTIVE JAMMING-SIGNAL CANCELER FOR RADAR RECEIVER

FIELD OF THE INVENTION

My present invention relates to a receiver for a radar system in which echoes of outgoing waves reflected by a detected target are contaminated by accompanying interfering signals from a jammer.

BACKGROUND OF THE INVENTION

Various techniques for suppressing such interfering signals in radar receivers are known. These techniques include, for example, the coding of the transmitted radar pulses in time and/or frequency as well as the establishment of nulls in the radiation diagram of the receiving antenna which point in the directions of the jammers. The latter measure, of course, is effective only if the location of the source or sources of interfering signals is known and is well separated from the area to be scanned.

In a paper titled "Adaptive Circular Polarization" by Fred E. Nathanson, presented at the 1975 IEEE International Radar Conference in Washington, D.C., there has been described an adaptive canceler designed to minimize the effect of atmospheric clutter upon the incoming echo signals. According to that proposal the outgoing signals are transmitted with circular polarization and the incoming signals are processed in one of two parallel circuit branches, depending on whether they are derived from incident waves that are circularly polarized in the same sense as the outgoing signals or in the opposite sense. The auxiliary signals in the opposite-sense branch are applied to a compensator, including a homodyne detector and a homodyne modulator in cascade with each other, where they are shifted in phase and reduced in amplitude to match the estimated interfering component of the incoming main signal in the same-sense branch from which a cancellation signal emitted by the compensator is subtracted. The compensator also receives a feedback signal, derived from the purged incoming signal at the output of the subtractor, for a continuous updating of the cancellation signal with a certain hysteresis introduced by an integrator or low-pass filter which lies between the cascaded stages of the compensator.

As noted in the above-identified paper, atmospheric clutter consists essentially of more or less spherical particles such as raindrops tending to reflect the incident circularly polarized waves with a reversed sense of polarization. This, however, is not the case with sources of jamming signals whose mode of polarization, in fact, may change from time to time in an unpredictable manner.

OBJECT OF THE INVENTION

The object of my present invention, therefore, is to provide means for enabling the utilization of the principle of adaptive cancellation in a radar receiver subject to interference by jamming signals.

SUMMARY OF THE INVENTION

I realize this object, in accordance with my present invention, by providing antenna means supplying a first and a second circuit branch or channel with respective incoming signals derived from incident waves with mutually orthogonal linear polarization. Each channel includes an algebraic summing circuit with an additive input port receiving the incoming signal of its own channel, a subtractive input port receiving a cancellation signal from a respective adaptive compensator associated with that channel, and an output port emitting a purged signal. Each adaptive compensator has two input leads, namely a supply lead connected to the input port of the summing circuit of the other channel and a feedback lead connected to the output port of the summing circuit of its own channel, for generating the aforementioned cancellation signal designed to suppress the interfering component of the incoming signal in the latter channel. The output ports of the two summing circuits are further connected to a channel selector which compares the magnitudes of their purged signals and delivers the predominating signal to a load such as a visualizer.

The adaptive compensator provided in accordance with my invention for each of the two channels may be generally similar to the one conventionally used for the cancellation of atmospheric clutter and may thus include a detector and a modulator stage in cascade with each other but with inputs connected in parallel to the supply lead originating at the opposite channel. Since, however, linear rather than circular polarization is involved, these stages need not be provided with phase shifters like those described in the aforementioned Nathanson paper. An integrator inserted between the two stages, such as a low-pass filter with a narrow pass band, should have a time constant less than the minimum interval between possible polarization changes of the interfering signal; this time constant, however, ought to be many times greater than the time corresponding to a resolution cell of the radar. By the same token the channel selector preferably includes a comparator of a control circuit with a limited symmetrical hysteresis designed to prevent switchovers in response to transient changes in the relative magnitude of the two purged signals, the comparison of these signals being advantageously made in terms of power as determined by logarithmic amplifiers through which they are passed before reaching the comparator.

It should be noted that my invention is not limited to pulse-type radars and can be used with both rotary and phase-shift-scanning antennas.

BRIEF DESCRIPTION OF THE DRAWING

The above and other features of my invention will now be described in detail with reference to the accompanying drawing in which.

SPECIFIC DESCRIPTION

Figure 1:
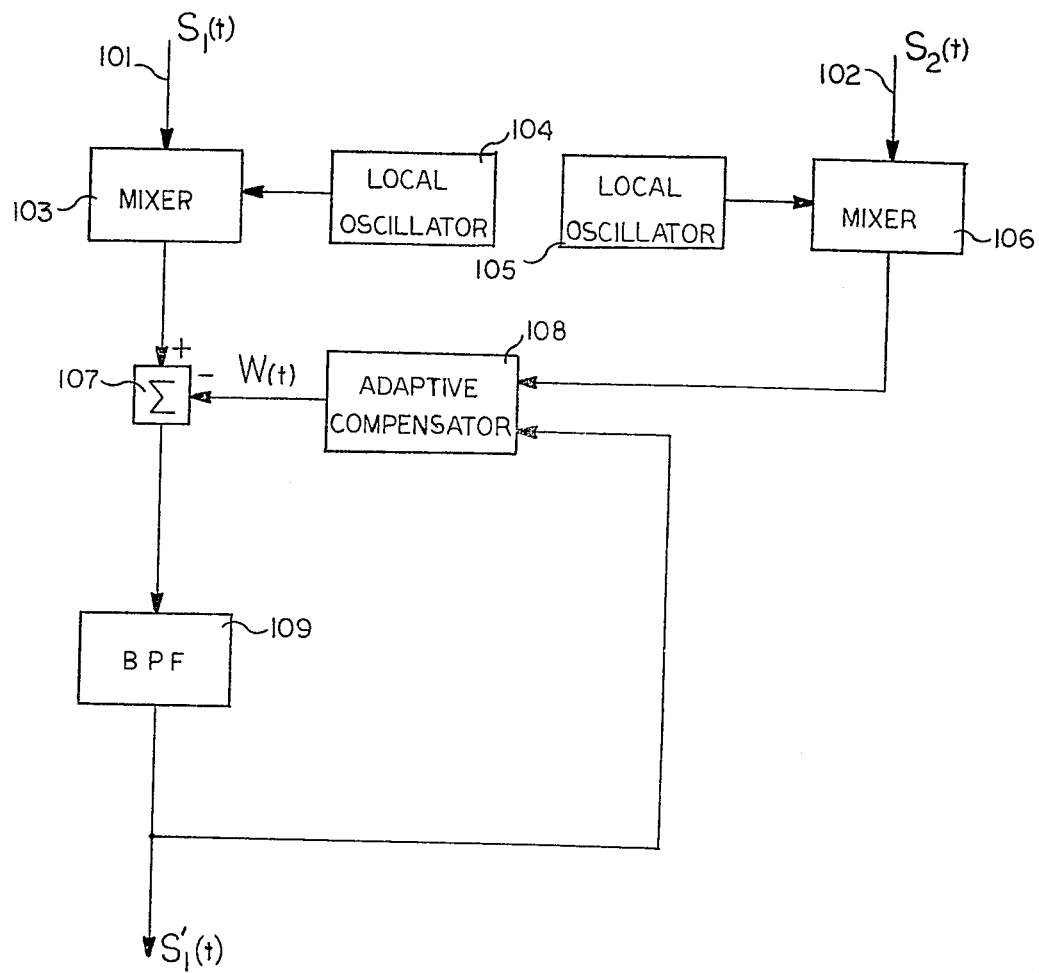
FIG. 1 is a block diagram of a prior-art canceler as described in the above-identified Nathanson paper.

FIG. 1 illustrates an adaptive canceler of the type described in the Nathanson paper designed for the suppression of false echoes due to atmospheric clutter. An antenna system (not shown) of a radar receiver delivers incoming high-frequency signals $S_1(t)$ and $S_2(t)$ to two circuit branches 101, 102 in which these signals are stepped down to an intermediate-frequency range by respective mixers 103 supplied with heterodyning frequencies from local oscillators 104 and 105. Circuit branch 101 further includes an algebraic summing circuit 107 with an additive input port connected to the output of mixer 103 and with a subtractive input port receiving a cancellation signal W(t) from an adaptive compensator 108. The incident waves carrying signals $S_1(t)$ and $S_2(t)$, like those sent out by an associated transmitter (not shown), are circularly polarized; the main signal $S_1(t)$ is conveyed by waves having the same sense of polarization as the outgoing radiation whereas the waves conveying the auxiliary signal $S_2(t)$ are polarized in the opposite sense. A purged signal $S'_1(t)$, appearing in the output of summing circuit 107 and clearing a band-pass filter 109, is delivered to a nonillustrated load and is also fed back to an input of compensator 108 whose second input receives the signal $S_2(t)$ from mixer 106. As explained in the Nathanson paper, and as briefly discussed hereinabove, the compensator 108 includes a homodyne detector receiving the two signals $S'_1(t)$ and $S_2(t)$ and feeding two components of signal $S_2(t)$ in relative quadrature to a pair of balanced mixers also receiving the signal $S'_1(t)$ in noninverted and inverted form respectively; the resulting signals travel via respective low-pass filters and amplifiers to a homodyne modulator in which they are further mixed with the auxiliary signal $S_2(t)$ in noninverted and inverted form respectively. The cancellation signal W(t) is the sum of the output signals of the homodyne modulator.

Figure 2:
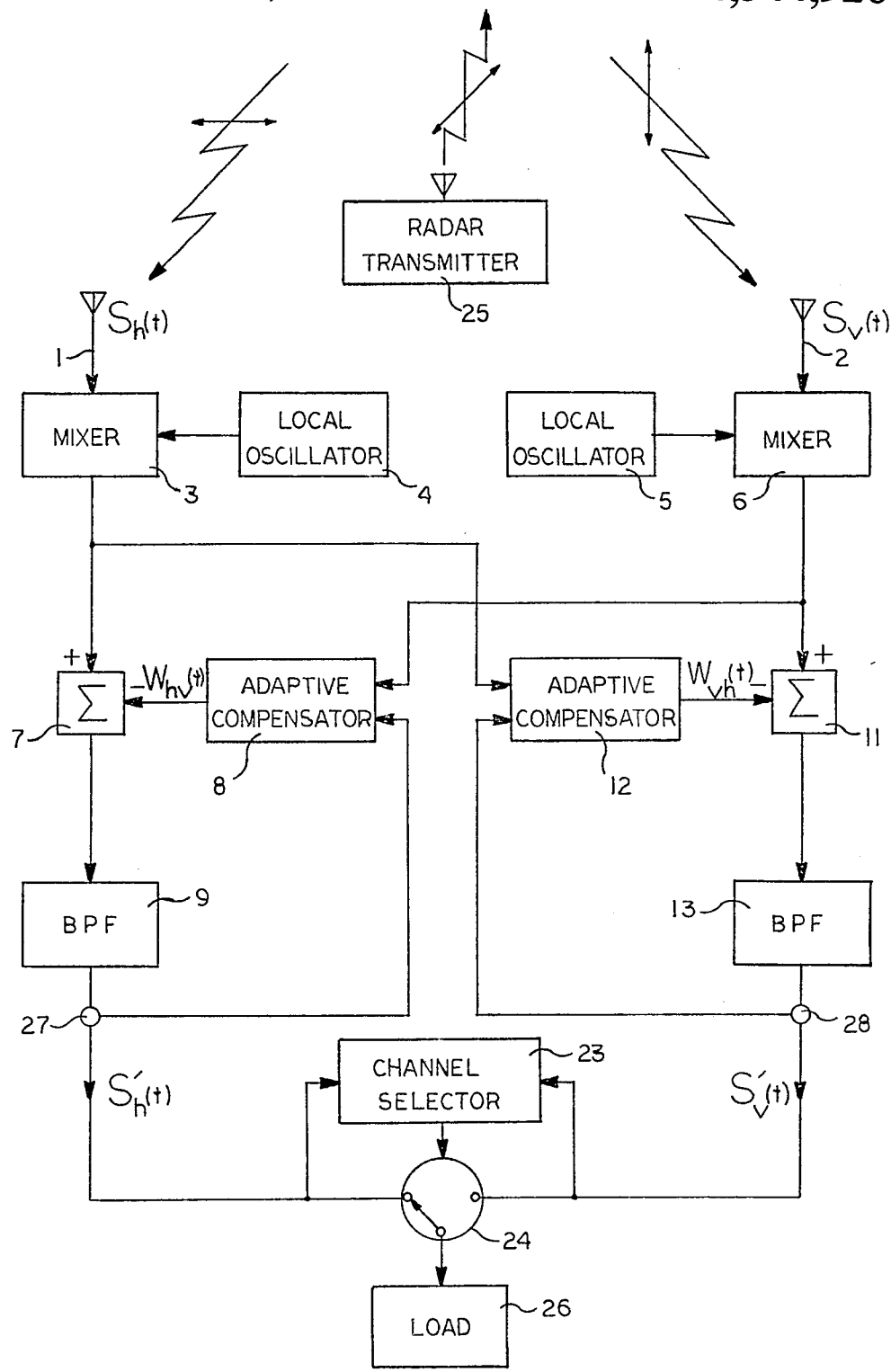
FIG. 2 is a block diagram of a radar system equipped with an adaptive jamming-signal canceler according to my invention.

In FIG. 2 I have shown a radar transmitter 25 sending out high-frequency waves which could be either circularly or linearly polarized; as particularly indicated by way of example, their polarization is linear with the electric-field vector inclined at 45° to the horizontal. Incident echoes of these outgoing waves have two components with mutually orthogonal linear polarization, here horizontal and vertical, giving rise to incoming signals $S_h(t)$ and $S_v(t)$, respectively. Theoretically, and in the absence of interferences, these two incoming signals should have approximately the same power at least when reflected from a substantially planar surface.

Signal $S_h(t)$ travels through a channel 1 in which it is stepped down to a convenient frequency range by a mixer 3 heterodyning it with a carrier from a local oscillator 4. Similarly, signal $S_v(t)$ travels through a channel 2 including a mixer 6 heterodyning it with a carrier from a local oscillator 5. These stepped-down signals reach additive input ports (+) of respective algebraic summing circuits 7 and 11 whose substractive input ports (−) receive cancellation signals $W_{hv}(t)$ and $W_{vh}(t)$ from respective adaptive compensators 8 and 12 of identical structure more fully described hereinafter with reference to FIG. 3. Each summing circuit supplies a respective purged signal $S'_h(t)$, $S'_v(t)$ to an output port 27, 28 by way of an associated band-pass filter 9, 13 designed to block residual interferring components lying outside the frequency spectrum of the emitted radar signal. Each compensator 8, 12 has an input connected via a feedback lead to the output port 27, 28 of its own channel and another input cross-connected via a supply lead to the additive input port of the summing circuit 11, 7 of the opposite channel. Output ports 27, 28 are further connected to respective inputs of a channel selector 23 and to terminals of an electronic switch 24 which, under the control of 25 selector 23, delivers the purged signal $S'_h(t)$ or $S'_v(t)$ to a load 26 for visualization or further processing. Channels 1 and 2, of course, may include additional amplifying stages which have not been illustrated.

Figure 3:
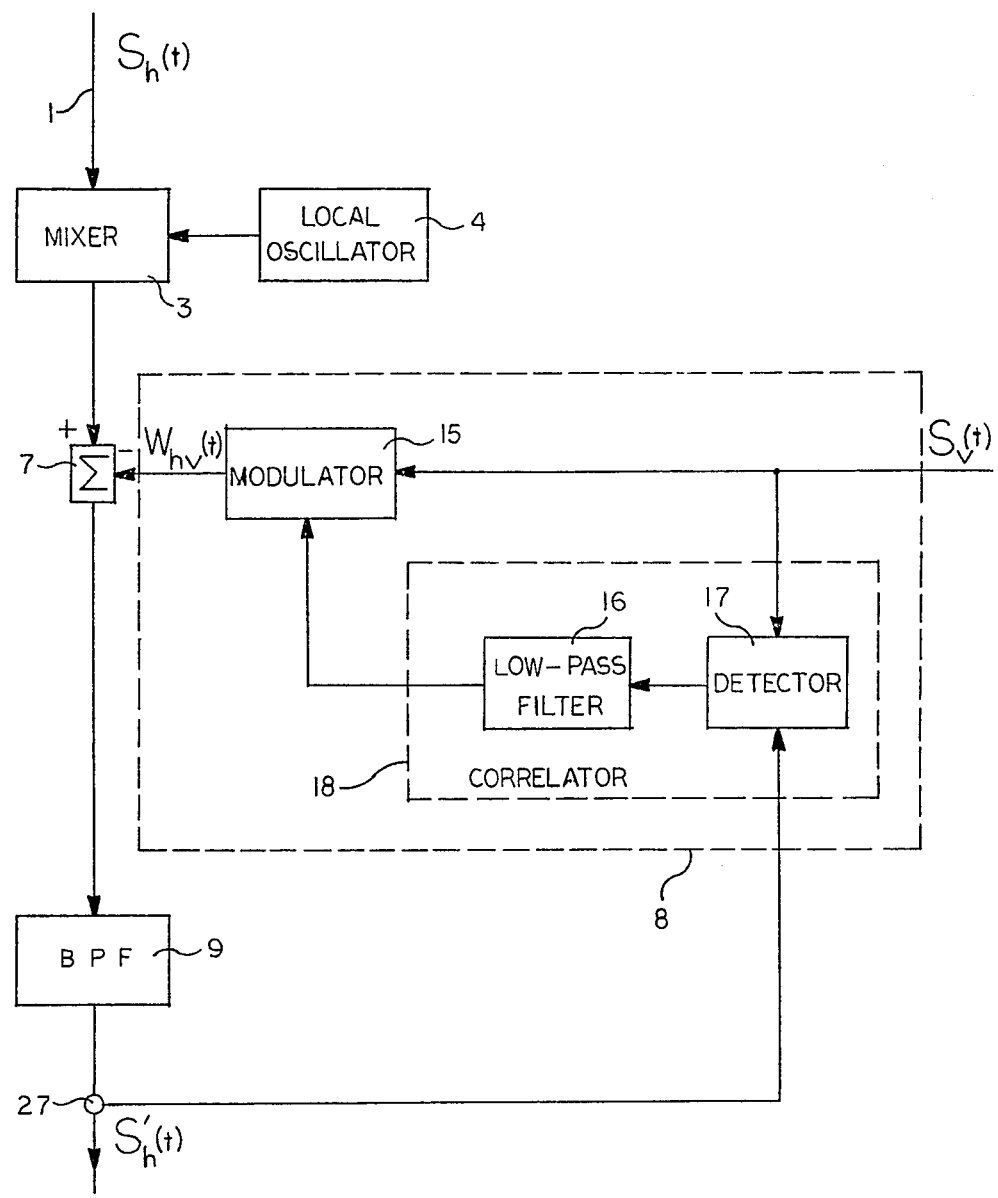
FIG. 3 is a more detailed diagram of one of two adaptive compensators forming part of the canceler of FIG. 2.

I shall now refer to FIG. 3 for a more detailed description of the adaptive compensator 8 which is also representative of its mate 12. Compensator 8 comprises two mixing stages which, in conformity with the terminology used in the Nathanson paper, have been termed a detector 17 and a modulator 15; they are interconnected through a narrow-band low-pass filter 16 preferably having a time constant equaling about 10 to 20 resolution cells of the radar. Detector 17, which together with filter 16 forms what may be termed a correlator 18, homodynes the incoming signal $S_v(t)$ from the companion channel 2 with the purged signal $S'_h(t)$ from the output port 27 of its associated channel and delivers the result by way of filter 16 to the homodyning input of modulator 15 which also receives the incoming signal $S_v(t)$ and emits the cancellation signal $W_{hv}(t)$. The latter signal is continuously updated by the feedback from port 27, at a rate limited by the aforementioned time constant, to follow changes in the operating pattern of the jammer whose signal is to be suppressed.

Figure 4:
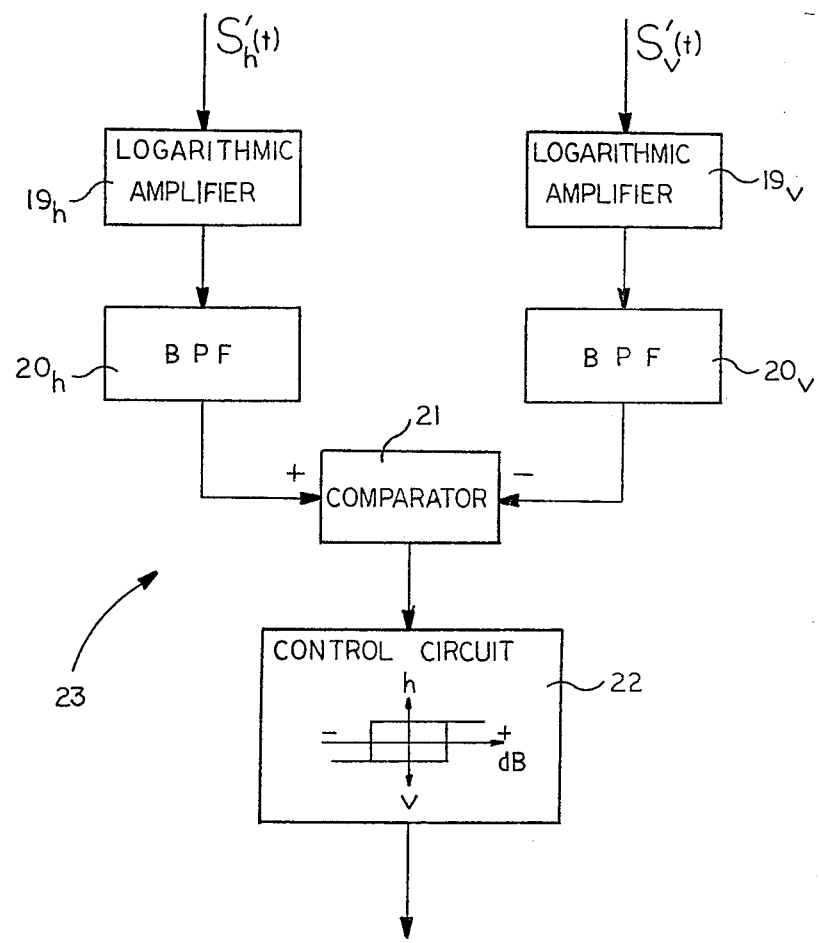
FIG. 4 is a more detailed diagram of a channel selector included in the system of FIG. 2.

Channel selector 23, illustrated in greater detail in FIG. 4, comprises two logarithmic amplifiers 19$h$ and 19$v$ feeding signals proportional to the powers of the purged signals $S'_h(t)$, $S'_v(t)$ by way of respective band-pass filters 20$h$, 20$v$ to a noninverting and an inverting input of a comparator 21, such as a differential amplifier, working into a control circuit 22. The latter, operating with a limited symmetrical hysteresis of preferably not more than about ±3 dB, sets the electronic switch 24 (FIG. 2) according to which of the two purged signals predominates. Circuits 21 and 22 could, of course, be combined into a single unit; as pointed out above, the inherent hysteresis avoids any unnecessary switchovers due to brief fluctuations in the relative signal power.

I claim:

1. A receiver for echoes of radar signals sent out by an associated transmitter, said echoes being accompanied by interfering signals from a jammer, comprising:
   antenna means feeding respective incoming signals, derived from incident waves with mutually orthogonal linear polarization, to a first and a second channel;
   a first algebraic summing circuit in said first channel with a first additive input port, a first subtractive input port and a first output port;
   a second algebraic summing circuit in said second channel with a second additive input port, a second subtractive input port and a second output port;
   a first adaptive compenator associated with said first channel and provided with input connections including a supply lead extending from said first output port and a feedback lead extending from said second input port, said first compensator further having an output lead connected to said first subtractive input port, said first additive input port receiving the incoming signal of said first channel;
   a second adaptive compensator associated with said second channnel and provided with input connections including a supply lead extending from said second output port and a feedback lead extending from said first input port, said second compensator further having an output lead connected to said second subtractive input port, said second additive input port receiving the incoming signal of said second channel, each of said compensators emitting on the respective output lead thereof a cancellation signal converting the incoming signal of the associated channel into a purged signal by suppressing an intefering component accompanying same; and selection means connected to said first and second output ports for comparing the magnitudes of the purged signals thereof and delivering the predominant purged signal to a load, each of said compensators comprising mixer means homodyning the purged signal from the associated channel with the incoming signal from the opposite channel, said mixer means comprising a detector having inputs respectively connected to said supply and feedback leads and a modulator having inputs respectively connected to said supply lead and, by way of a narrow-band low-pas filter, to an output of said detector.

2. A receiver as defined in claim 1 wherein said first channel further includes a first mixer upstream of said first input port and said second channel further includes a second mixer upstream of said second input port, each of said mixers receiving a local oscillation for stepping down the frequency of the respective incoming signal.

3. A receiver as defined in claim 1 wherein each channel further includes a band-pass filter inserted between the respective algebraic summing circuit and the output port thereof.

4. A receiver as defined in claim 1 wherein said selection means comprises a pair of logarithmic amplifiers respectively connected to said first and second output ports, a pair of band-pass filters receiving respective output signals of said logarithmic amplifiers, a control circuit with limited symmetrical hysteresis including a signal-power comparator differentially connected to said band-pass filters, and switchover means responsive to said control circuit for connecting either of said first and second output ports to the load.

* * * * *